United States Patent [19]
Nordstrom

[11] Patent Number: 5,967,567
[45] Date of Patent: Oct. 19, 1999

[54] MATINGLY ENGAGED FLEXIBLE ENTRY BOOT

[75] Inventor: Daniel P. Nordstrom, Twin Lake, Mich.

[73] Assignee: Advanced Polymer Technology, Inc., Muskegon, Mich.

[21] Appl. No.: 09/006,738

[22] Filed: Jan. 15, 1998

[51] Int. Cl.[6] ............................... E21B 19/00; F16L 5/00
[52] U.S. Cl. .................................... 285/139.1; 285/139.2; 285/205; 285/207; 285/252
[58] Field of Search ........................... 285/192, 205–207, 285/139.1, 139.2, 252, 253, 206, 236

[56] References Cited

U.S. PATENT DOCUMENTS

| | | |
|---|---|---|
| D. 309,308 | 7/1990 | Webb . |
| D. 313,418 | 1/1991 | Webb . |
| D. 322,970 | 1/1992 | Webb . |
| 0,845,760 | 3/1907 | Coffin . |
| 1,317,260 | 9/1919 | Armstrong . |
| 1,582,191 | 4/1926 | Snooke . |
| 1,639,495 | 8/1927 | Frame . |
| 1,712,510 | 5/1929 | Monie . |
| 1,793,038 | 2/1931 | Zimmermann . |
| 2,151,770 | 3/1939 | James . |
| 2,254,668 | 9/1941 | Tomek . |
| 2,310,877 | 2/1943 | Sperry . |
| 2,336,150 | 12/1943 | Horvath . |
| 2,410,999 | 11/1946 | Reisner . |
| 2,441,009 | 5/1948 | Cunningham . |

(List continued on next page.)

FOREIGN PATENT DOCUMENTS

| | | |
|---|---|---|
| 150132 | 5/1951 | Australia . |
| 200618 | 10/1955 | Australia . |
| 1068961 | 1/1980 | Canada . |
| 2047354 | 1/1992 | Canada . |
| 0245418 | 6/1969 | Russian Federation . |
| 0209931 | 1/1924 | United Kingdom . |
| 0595584 | 12/1947 | United Kingdom . |
| 0632756 | 12/1949 | United Kingdom . |
| 0667165 | 2/1952 | United Kingdom . |
| 1087178 | 10/1967 | United Kingdom . |
| 1144475 | 3/1969 | United Kingdom . |
| WO 90/04157 | 4/1990 | WIPO . |
| WO 90/07074 | 6/1990 | WIPO . |
| WO 93/17266 | 9/1993 | WIPO . |
| WO 95/09998 | 4/1995 | WIPO . |

OTHER PUBLICATIONS

Advanced Polymer Technology Inc., *Apt. Tech–Notes—Flexible Entry Boot Installation*, Issue 102 (Sep. 1993).
Total Containment Inc., *Sump/Riser—Installation Instructions*(Apr. 15, 1989).
Total Containment Inc., *Enviroflex—Flexible Double–Wall Piping System* (Mar. 1, 1991).
Environ Products Inc., *Environ Safe Products—Designed for Future Generations* (1993).

*Primary Examiner*—Anthony Knight
*Assistant Examiner*—Gary Grafel
*Attorney, Agent, or Firm*—Young & Basile, P.C.

[57] ABSTRACT

A flexible entry boot provides a fluid-tight fitting between a wall of a fluid containment region and a conduit passing through the wall. The flexible entry boot comprises a seal member disposed within the containment region; and a securing plate disposed within the containment region and releasably mounted to the seal member. A flexibly rigid, hollow support sleeve is attached to the seal member. The hollow support sleeve has a degree of flexibility sufficient to allow for the insertion of the conduit at angles equal to or other than an angle normal to the fluid containment wall while maintaining a fluid-tight environment. A mechanism is provided for releasably attaching the hollow support sleeve to the conduit. An outer sealing member is disposed outside the containment region; and an inner sealing member is disposed inside the containment region, the inner sealing member being matingly and sealingly engageable with the outer sealing member, with the wall of the fluid containment region extending therebetween. A mechanism is provided for releasably attaching the seal member to the inner sealing member.

24 Claims, 5 Drawing Sheets

U.S. PATENT DOCUMENTS

| | | |
|---|---|---|
| 2,449,229 | 9/1948 | Hopwood . |
| 2,671,573 | 3/1954 | Hendon et al. . |
| 2,688,497 | 9/1954 | Brisack . |
| 2,691,538 | 10/1954 | Clausen . |
| 2,717,792 | 9/1955 | Pelley . |
| 2,813,692 | 11/1957 | Bremer et al. . |
| 2,870,881 | 1/1959 | Rogge . |
| 2,906,500 | 9/1959 | Knapp et al. . |
| 2,911,001 | 11/1959 | Fuller . |
| 3,010,598 | 11/1961 | Foss . |
| 3,098,663 | 7/1963 | Dibley . |
| 3,178,206 | 4/1965 | Martin et al. . |
| 3,243,240 | 3/1966 | Arthur . |
| 3,362,425 | 1/1968 | Morris et al. . |
| 3,389,560 | 6/1968 | Zemsky . |
| 3,390,224 | 6/1968 | Wyatt . |
| 3,401,958 | 9/1968 | Demyon . |
| 3,408,778 | 11/1968 | Mason . |
| 3,423,518 | 1/1969 | Weagant . |
| 3,439,837 | 4/1969 | Hearn et al. . |
| 3,459,229 | 8/1969 | Croft . |
| 3,518,359 | 6/1970 | Trimble et al. . |
| 3,531,264 | 9/1970 | Greipel . |
| 3,543,377 | 12/1970 | Bremner . |
| 3,615,034 | 10/1971 | Lemelson . |
| 3,654,382 | 4/1972 | Rubright . |
| 3,707,852 | 1/1973 | Burckhardt et al. . |
| 3,712,009 | 1/1973 | Campagna . |
| 3,715,958 | 2/1973 | Crawford et al. . |
| 3,721,270 | 3/1973 | Wittgenstein . |
| 3,759,280 | 9/1973 | Swanson . |
| 3,802,456 | 4/1974 | Wittgenstein . |
| 3,858,752 | 1/1975 | Marvin, Jr. et al. . |
| 3,859,802 | 1/1975 | Platner et al. . |
| 3,882,976 | 5/1975 | Nash . |
| 3,905,405 | 9/1975 | Fowler et al. . |
| 3,938,285 | 2/1976 | Gilbu . |
| 3,972,440 | 8/1976 | Warren . |
| 3,995,332 | 12/1976 | Forchini et al. . |
| 3,997,760 | 12/1976 | Salinger . |
| 4,062,376 | 12/1977 | McGrath . |
| 4,076,040 | 2/1978 | Alpers et al. . |
| 4,082,301 | 4/1978 | Salinger . |
| 4,089,139 | 5/1978 | Moffa et al. . |
| 4,109,976 | 8/1978 | Koch . |
| 4,132,083 | 1/1979 | McGrath . |
| 4,145,075 | 3/1979 | Holzmann . |
| 4,182,581 | 1/1980 | Uehara et al. . |
| 4,215,868 | 8/1980 | Skinner et al. . |
| 4,230,234 | 10/1980 | Taylor . |
| 4,249,758 | 2/1981 | Harris . |
| 4,262,166 | 4/1981 | Radzishevsky et al. . |
| 4,275,757 | 6/1981 | Singer . |
| 4,291,905 | 9/1981 | Schrock . |
| 4,309,128 | 1/1982 | Williams . |
| 4,327,925 | 5/1982 | Alexander et al. . |
| 4,365,829 | 12/1982 | Fowler . |
| 4,387,900 | 6/1983 | Ditcher et al. . |
| 4,449,715 | 5/1984 | Gagas . |
| 4,449,853 | 5/1984 | Mennella et al. . |
| 4,472,911 | 9/1984 | Jooris et al. . |
| 4,492,392 | 1/1985 | Woods et al. . |
| 4,512,148 | 4/1985 | Jacobson . |
| 4,530,443 | 7/1985 | Gorges . |
| 4,540,310 | 9/1985 | Ditcher et al. . |
| 4,552,386 | 11/1985 | Burchette . |
| 4,568,925 | 2/1986 | Butts . |
| 4,619,555 | 10/1986 | Skinner et al. . |
| 4,621,941 | 11/1986 | Ditcher et al. . |
| 4,639,164 | 1/1987 | Pugnale et al. . |
| 4,659,251 | 4/1987 | Petter et al. . |
| 4,667,505 | 5/1987 | Sharp . |
| 4,685,327 | 8/1987 | Sharp . |
| 4,696,330 | 9/1987 | Raudman et al. . |
| 4,702,645 | 10/1987 | Skinner et al. . |
| 4,709,723 | 12/1987 | Sidaway et al. . |
| 4,711,365 | 12/1987 | Fomby . |
| 4,714,095 | 12/1987 | Muller et al. . |
| 4,717,036 | 1/1988 | Dundas et al. . |
| 4,731,501 | 3/1988 | Clark et al. . |
| 4,747,453 | 5/1988 | Howard, Sr. . |
| 4,763,806 | 8/1988 | Podgers et al. . |
| 4,767,108 | 8/1988 | Tanaka et al. . |
| 4,770,317 | 9/1988 | Podgers et al. . |
| 4,770,562 | 9/1988 | Muller et al. . |
| 4,775,073 | 10/1988 | Webb . |
| 4,782,430 | 11/1988 | Robbins et al. . |
| 4,797,513 | 1/1989 | Ono et al. . |
| 4,805,444 | 2/1989 | Webb . |
| 4,809,866 | 3/1989 | Crocker . |
| 4,870,856 | 10/1989 | Sharp . |
| 4,871,084 | 10/1989 | Robbins . |
| 4,890,863 | 1/1990 | Westhoff et al. . |
| 4,896,705 | 1/1990 | Podgers et al. . |
| 4,905,940 | 3/1990 | Luka . |
| 4,912,287 | 3/1990 | Ono et al. . |
| 4,924,923 | 5/1990 | Boehmer et al. . |
| 4,928,349 | 5/1990 | Oikawa et al. . |
| 4,932,257 | 6/1990 | Webb . |
| 4,958,957 | 9/1990 | Berg et al. . |
| 4,961,670 | 10/1990 | McKenzie et al. . |
| 4,968,179 | 11/1990 | Frahm . |
| 4,971,225 | 11/1990 | Bravo . |
| 4,971,477 | 11/1990 | Webb et al. . |
| 5,002,428 | 3/1991 | Shettel . |
| 5,030,033 | 7/1991 | Heintzelman et al. . |
| 5,039,137 | 8/1991 | Cankovic et al. . |
| 5,040,408 | 8/1991 | Webb . |
| 5,054,794 | 10/1991 | Westhoff et al. . |
| 5,058,633 | 10/1991 | Sharp . |
| 5,060,509 | 10/1991 | Webb . |
| 5,062,457 | 11/1991 | Timmons . |
| 5,076,456 | 12/1991 | Geyer . |
| 5,085,257 | 2/1992 | Smith . |
| 5,098,221 | 3/1992 | Osborne . |
| 5,099,894 | 3/1992 | Mozeley, Jr. . |
| 5,105,966 | 4/1992 | Fort et al. . |
| 5,114,271 | 5/1992 | Sunderhaus et al. . |
| 5,117,877 | 6/1992 | Sharp . |
| 5,129,428 | 7/1992 | Winter et al. . |
| 5,129,684 | 7/1992 | Lawrence et al. . |
| 5,134,878 | 8/1992 | Sharp . |
| 5,150,927 | 9/1992 | Skinner . |
| 5,156,292 | 10/1992 | Ross . |
| 5,209,601 | 5/1993 | Odill et al. . |
| 5,257,652 | 11/1993 | Lawrence . |
| 5,263,794 | 11/1993 | Webb . |
| 5,271,518 | 12/1993 | Webb . |
| 5,295,760 | 3/1994 | Rowe . |
| 5,297,896 | 3/1994 | Webb . |
| 5,333,490 | 8/1994 | Webb . |
| 5,366,318 | 11/1994 | Brancher . |
| 5,372,453 | 12/1994 | Argandona . |
| 5,398,976 | 3/1995 | Webb . |
| 5,423,447 | 6/1995 | Youngs . |
| 5,431,457 | 7/1995 | Youngs . |
| 5,481,790 | 1/1996 | Koreis et al. . |
| 5,482,400 | 1/1996 | Bavington . |
| 5,490,419 | 2/1996 | Webb . |
| 5,501,472 | 3/1996 | Brancher et al. . |
| 5,704,656 | 1/1998 | Rowe ................................ 285/206 X |
| 5,722,699 | 3/1998 | Brancher . |
| 5,810,400 | 9/1998 | Youngs ................................ 285/139.1 |
| 5,826,919 | 10/1998 | Bravo et al. ........................ 285/139.2 |

MATINGLY ENGAGED FLEXIBLE ENTRY BOOT

BACKGROUND OF THE INVENTION

The present invention relates generally to a fitting for a containment chamber and, more particularly, to a matingly engaged flexible entry boot for providing a fluid-tight fitting between a wall of a fluid containment region and a conduit passing through the wall.

For many years in the area of fluid fittings, some structures have been of a permanent variety which include welding or bonding of the exterior wall of the conduit to the wall opening of the fluid containment region through which the conduit extends. Other structures, such as that disclosed in U.S. Pat. No. 4,775,073, disclose the use of a fitting system which is installed at a factory and then adapted by the user to fit his needs. Such manufacturing processes of fluid containment structures are limited since they require built-in fitting systems for which some users may not have any need, use and/or desire.

Moreover, many of these fitting structures require fixedly attaching the conduit at an angle perpendicular to the containment region wall. For example, U.S. Pat. Nos. 5,129,684; 4,775,073; 4,492,392; and 2,310,877 teach conduit fitting systems which require the conduit to be placed at an angle normal to the containment wall. If the angle is not normal, the fluid-tight seal will be breached. Such requirements greatly inhibit the use of the fitting system since a conduit cannot be inserted into the containment wall at angles which are other than normal while still maintaining a fluid-tight environment.

Figure 6:
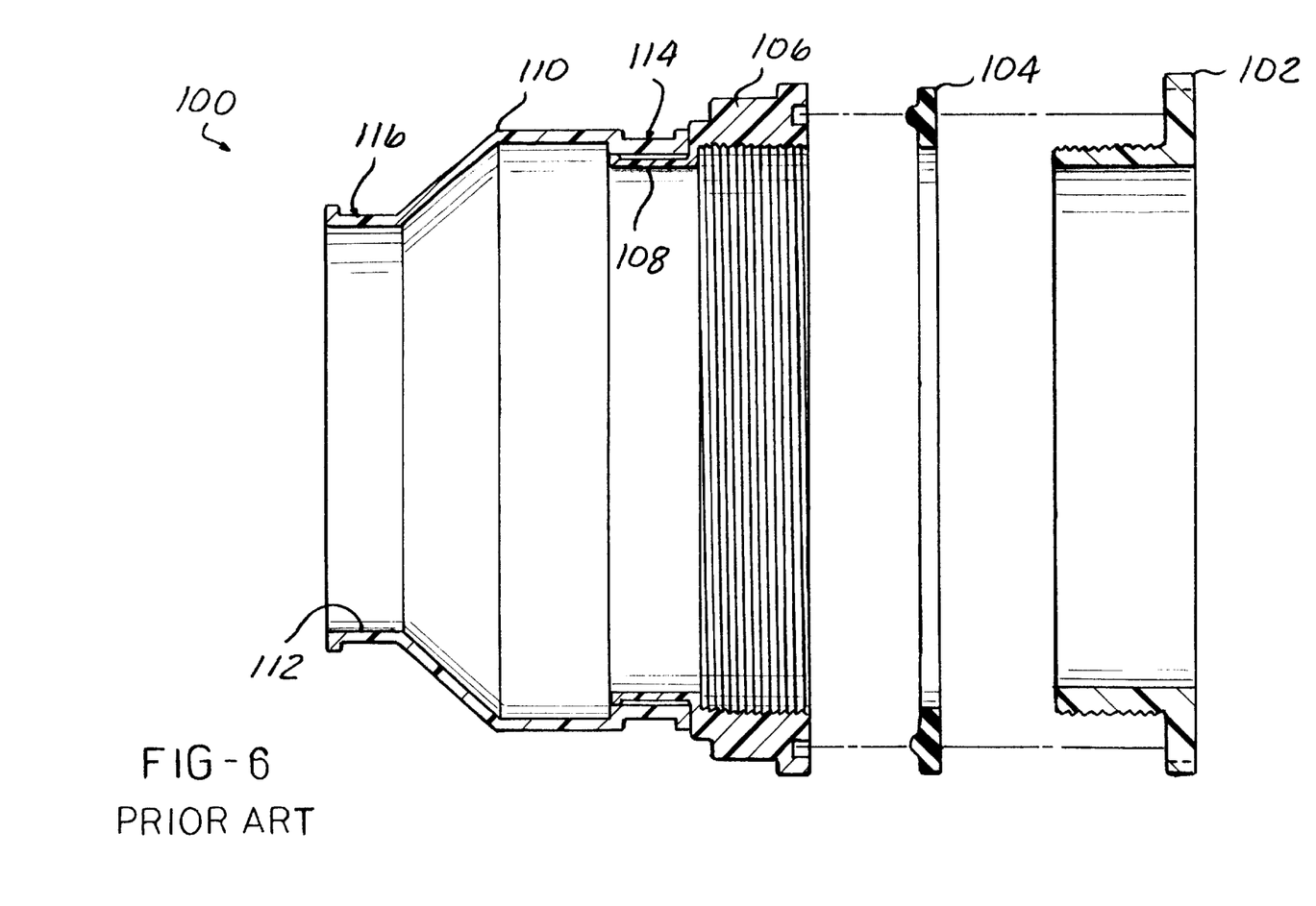
FIG. 6 is a partially exploded cross-sectional view of a prior art bulkhead fitting.

A prior art bulkhead fitting 100 is shown in FIG. 6. This fitting 100 includes a threadingly engageable flanged member 102 outside the containment region. Inside the containment region is a gasket 104; and the mating member 106 for threading engagement with the flanged member 102. The threads both on member 102 and mating member 106 are square threads. At an end distal from the threadingly engaged end, mating member 106 includes an annular lip 108, over which a flexible boot portion 110 is placed. A conduit (not shown) is inserted through opening 112, and worm gear hose clamps (not shown) secure the boot portion 110 and conduit at clamping areas 114 and 116, respectively. However, several drawbacks exist with this fitting 100. Due to the circumferential seal between annular lip 108 and boot portion 110, if the materials of which boot portion 110 and mating member 106 are made do not have exactly the same coefficient of expansion, lip 108 and boot portion 110 will expand and contract at different rates. This will make fitting 100 prone to leakage. In fact, under normal use pressures, such as water pressure and/or other exterior pressures, eg. backfill pressure, boot portion 110 may dislodge completely from mating member 106. Further, if to prevent such leakage, boot portion 110 is made to be tightly tensioned over lip 108 at any temperature and/or pressure, boot portion 110 will be very difficult to remove for repair and/or replacement; and it will be extremely difficult to replace while within the strict confines of a buried sump or the like. Further, lip 108 is quite thin, and substantially thinner than the remainder of mating member 106; as such, lip 108 may be weak and prone to breakage. A further disadvantage is that the same sized fitting 100 is used to accommodate various diameter piping systems. As the boot portion 110 is quite large, when a smaller diameter pipe (such as a 1" pipe) is installed therein, the consequently large gaps therearound are prone to fill with backfill gravel and the like, further making fitting 100 prone to failure.

Thus, it is an object of the present invention to provide a fluid-tight entry boot for use with fluid-tight fitting systems, which boot has the advantage of easy installation for a user. It is a further object of the present invention to provide such an entry boot which has at least one seal member substantially fully disposed within the containment region, which advantageously protects the seal member from ground and weather exposure. It is yet a further object of the present invention to provide a flexible entry boot which may be repaired and/or replaced without detaching the entire boot assembly from the wall of the containment region. Yet still further, it is an object of the present invention to provide such an entry boot which allows for the insertion of a conduit into a containment wall opening at angles which are not necessarily normal while maintaining a fluid-tight environment. Still further, it is an object of the present invention to provide such a fluid-tight system which is of simple construction and relatively easy and inexpensive to manufacture. It is yet a further object of the present invention to provide such an entry boot which can suitably withstand the effects of thermal expansion and contraction, while yet being quick and simple to replace and/or repair.

SUMMARY OF THE INVENTION

The present invention addresses and solves the above-mentioned problems and meets the enumerated objects and advantages, as well as others not enumerated, by providing a flexible entry boot for providing a fluid-tight fitting between a wall of a fluid containment region and a conduit passing through the wall. The flexible entry boot comprises a seal member disposed within the containment region. A securing plate is disposed within the containment region and is releasably mounted to the seal member. A flexibly rigid, hollow support sleeve is attached to the seal member, the sleeve having an outer surface and an inner, conduit receiving surface. The hollow support sleeve further has a degree of flexibility sufficient to allow for the insertion of the conduit at angles equal to or other than an angle normal to the fluid containment wall while maintaining a fluid-tight environment. Means are provided for releasably attaching the hollow support sleeve to the conduit.

The flexible entry boot further comprises an outer sealing member disposed outside the containment region; and an inner sealing member disposed inside the containment region, the inner sealing member being matingly and sealingly engageable with the outer sealing member, with the wall of the fluid containment region extending therebetween. Means are provided for releasably attaching the seal member to the inner sealing member.

BRIEF DESCRIPTION OF THE DRAWINGS

Other objects, features and advantages of the present invention will become apparent by reference to the following detailed description and drawings, in which.

DETAILED DESCRIPTION OF THE PREFERRED EMBODIMENTS

Figure 1:
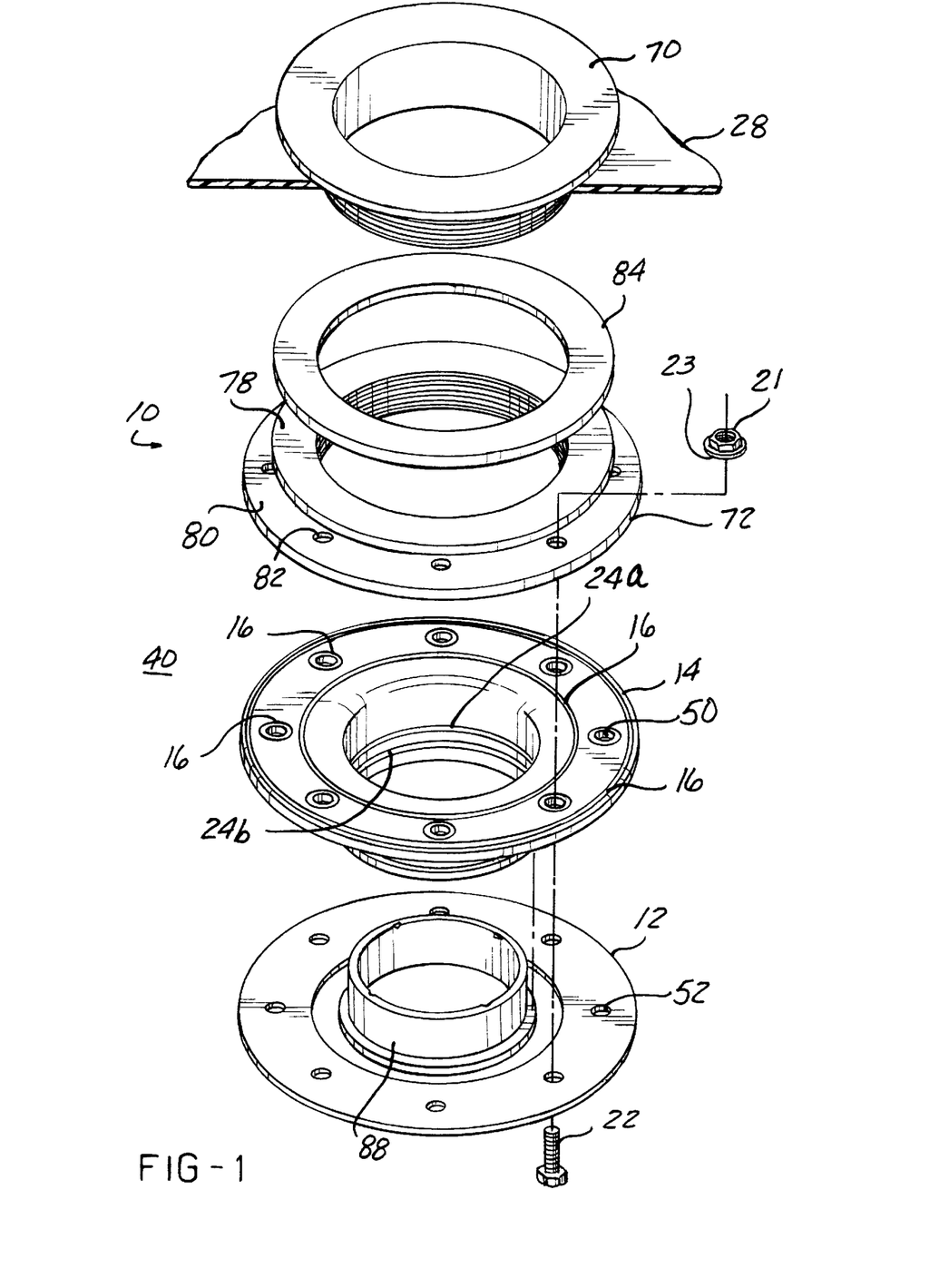
FIG. 1 is an exploded perspective view of the flexible entry boot of the present invention, showing the outer sealing member installed in the fluid containment wall which is broken away.
Figure 2:
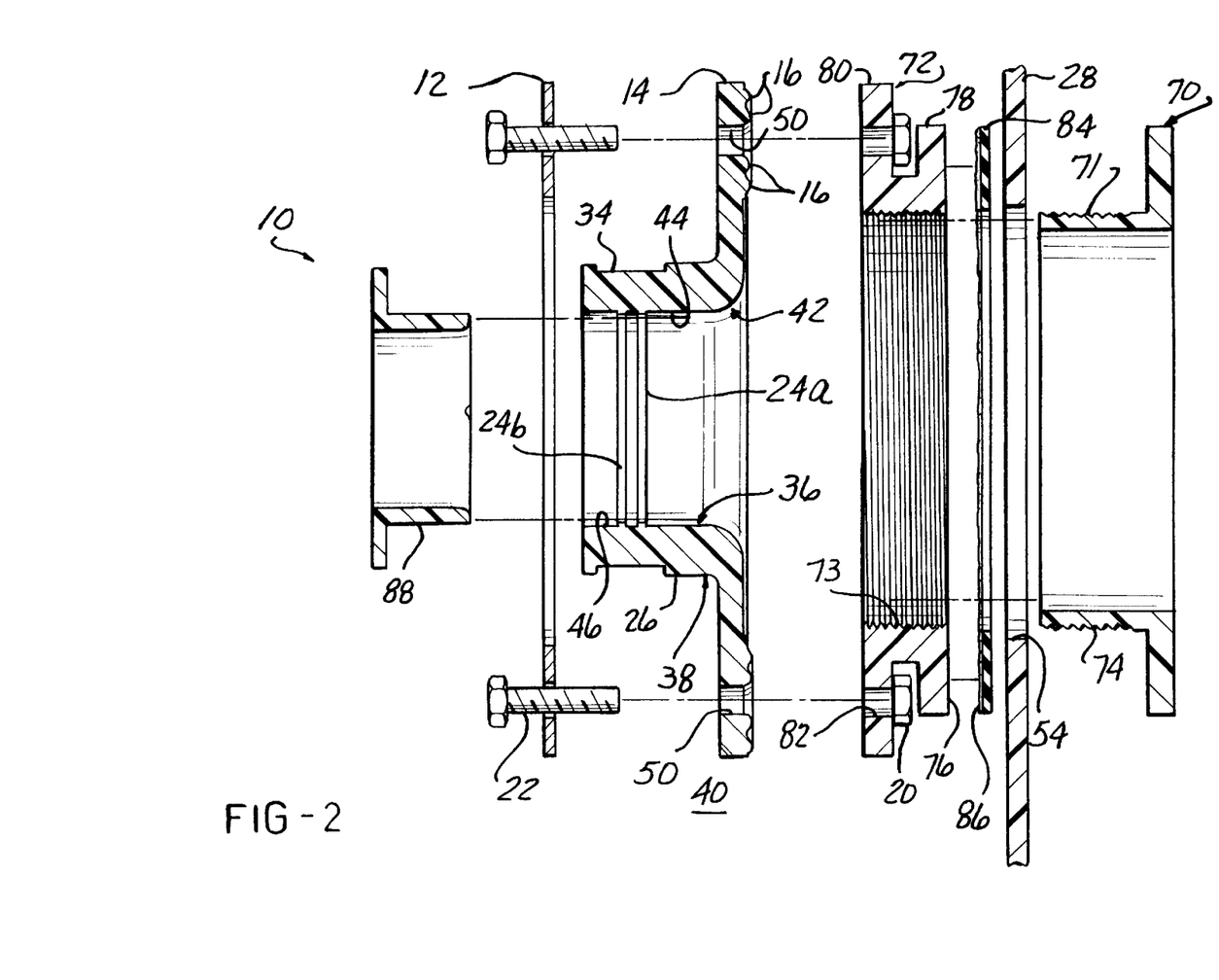
FIG. 2 is an enlarged, exploded cross-sectional of the flexible entry boot of FIG. 1.

Referring now to FIGS. 1 and 2, the flexible entry boot of the present invention is designated generally as 10. Entry boot 10 provides a fluid-tight fitting between a wall 28 of a fluid containment region 40 and a conduit (not shown) passing through wall 28. Flexible entry boot 10 comprises a seal member 14 disposed within containment region 40. Seal member 14 may also have sealing beads 16 integrally formed therewith and extending outwardly therefrom. However, it is to be understood that separate sealing washers, gaskets, or the like, may also be used. This seal member 14 may be formed of any suitable material, depending upon the particular requirements due to the fluid contained. Preferably, the seal member 14 will be formed from an oil and gas resistant material, or any other material which will be resistant to alcohols and hydrocarbons. More preferably, the seal member 14 is comprised of nitrile rubber and/or viton rubber, thermoplastic elastomers or epichlorohydrin rubber. A less desired yet suitable seal member 14 material which may be preferable is a thermoplastic elastomer commercially available under the trade name ALCRYN from E. I. du Pont de Nemours Company. Further, seal member 14 may be of any suitable shape and size, depending upon the manufacturer and particular end use. In the preferred embodiment, the seal member 14 is circular, as shown in FIG. 1.

Flexible entry boot 10 may further comprise a securing/compression plate 12 releasably mounted to seal member 14. In the preferred embodiment, this compression plate 12 is a screw securing plate. Similarly, this screw securing plate 12 may also be of any desired size and shape and of any suitable material. In the preferred embodiment, the screw securing plate 12 is circular and is formed from a suitably rigid metal material.

Referring now more particularly to FIG. 2, a flexibly rigid, cylindrical hollow support sleeve 26 is attached to seal member 14. Sleeve 26 preferably has a degree of flexibility sufficient to allow for the insertion of the conduit at angles equal to or other than a 90° angle, i.e. the conduit does not need to be inserted precisely perpendicular to the containment wall 28 in order to maintain a fluid-tight environment, and has a degree of flexion such that if moved after fitted, the fluid-tight environment remains intact. The amount of flexion may be any suitable desired amount, however, in the preferred embodiment, the hollow sleeve 26 provides for up to approximately a 30° offset from normal (90°) in any direction.

It is preferable, for ease in manufacturing and installation, as well as for optimum fluid tight fittings, that the sleeve 26 be integrally molded from the same material with seal member 14. However, it is to be understood that sleeve 26 and seal member 14 may be formed and/or connected by any suitable method(s).

Hollow sleeve 26 has a first open end portion 42 integrally attached to seal member 14, first open portion 42 having a central throughbore 44 in fluid communication with hollow support sleeve 26. Sleeve 26 has a second open end portion 46 opposed to, and integrally attached to first open portion 42, with first open portion 42 adapted to flexibly receive a conduit, and second open portion 46 adapted to releasably hold the conduit in place. It is to be understood that hollow support sleeve 26 may be formed in any suitable shape and of any suitable material, and may provide any degree of flexion as necessitated by the particular manufacturer and end use, as long as such choices serve the objects and advantages of the present invention as set forth hereinabove.

Figure 3:
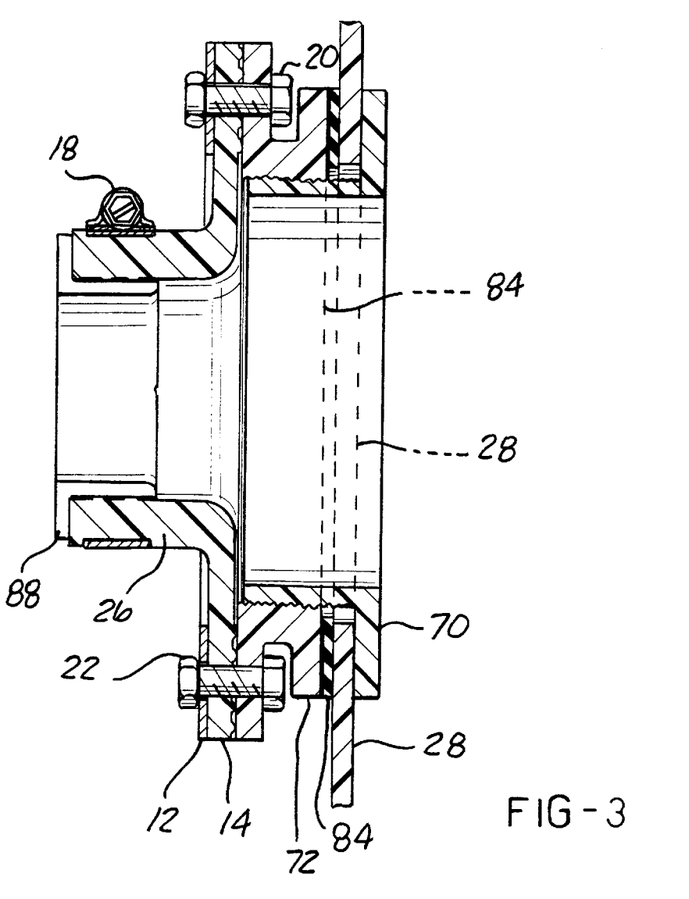
FIG. 3 is a cross-sectional view of the boot of FIG. 1, shown installed in the fluid containment wall which is broken away.

Means are provided for releasably attaching hollow support sleeve 26 to the conduit. It is to be understood that this releasable conduit attaching means may comprise any suitable means. However, in the preferred embodiment, this conduit attaching means comprises a worm gear hose clamp 18, as shown in FIG. 3.

The flexible entry boot 10 further comprises an outer sealing member 70 disposed outside the containment region 40. An inner sealing member 72 is disposed inside the containment region 40, the inner sealing member 72 being matingly and sealingly engageable with the outer sealing member 70, with the wall 28 of the fluid containment region 40 extending therebetween.

In the preferred embodiment, outer sealing member 70 is threadingly engaged with the inner sealing member 72 via threads 71, 73. It is preferable that threads 71, 73 be UNC threads (similar to bolt threads). It has been found that the boot 10 of the present invention using these threads 71, 73 could withstand more than three times the load, without failing, as opposed to the load under which the prior art fitting 100 in FIG. 6 (using square threads) failed (ie. member 102 broke apart from member 106). Without being bound to any theory, it is believed that the threads 71, 73 of boot 10 contributed to its much higher resistance to failure.

It is to be understood that outer sealing member 70 and inner sealing member 72 may be formed in any suitable shape and of any suitable material, as necessitated by the particular manufacturer and end use, as long as such choices serve the objects and advantages of the present invention as set forth hereinabove. However, in the preferred embodiment, one of the outer sealing member 70 and the inner sealing member 72 is a flanged male collar, and the other of the inner sealing member 72 and the outer sealing member 70 is a flanged female collar. As best seen in FIG. 2, outer sealing member 70 is a flanged male collar 74, and inner sealing member 72 is a flanged female collar 76. Containment wall 28 contains one bore 54, through which flanged male collar 74 threads into flanged female collar 76.

In that it is exposed to the surrounding soil or other environment, outer sealing member 70 is preferably formed from a suitable corrosion resistant material. It is further preferred that such material be a suitably rigid, yet somewhat flexible polymeric material. One such preferred material is an acetal resin material commercially available under the trade name CELCON M90 from Hoechst Celanese Co. Another preferred acetal resin material is commercially available under the trade name DELRIN P from E. I. du Pont de Nemours Co. One alternate preferred material is a glass filled nylon material. One of the advantages of using a flexibly rigid polymeric material as opposed to a metallic material is that if there is a degree of curvature at the point on the containment wall 28 surface at which the boot 10 is attached, the flexibly rigid polymeric material comprising the outer sealing member 70 may more easily flex and flatten against the surface of the wall 28, giving rise to an enhanced fluid tight seal.

Flexible entry boot 10 further comprises means for releasably attaching seal member 14 to the inner sealing member 72. Again, it is to be understood that this seal member attaching means may comprise any suitable means. However, in the preferred embodiment, this attaching means comprises a plurality of screw 22 and nut 20 assemblies, as seen assembled in FIG. 3. Since seal member 14 is attached to the inner sealing member 72, seal member 14 may be advantageously repaired and/or replaced without disengaging the outer sealing member 70 from the inner sealing member 72.

Although eight screw 22 and nut 20 assemblies are shown, it is to be understood that any suitable number may be used. Generally, the smaller diameter the conduit, the smaller diameter the seal member 14 is. Further, the smaller seal member 14 is, the fewer screw 22 and nut 20 assemblies are generally necessary. For illustrative, non-limitative purposes, a ½", ¾" and 1" conduit may use a seal member 14 having four screw 22 and nut 20 assemblies; while a 1 ½", 2" or larger conduit may use a seal member 14 having eight, ten or more screw 22 and nut 20 assemblies.

The screw 22 and nut 20 assemblies may be any conventionally known assemblies, and further, it is to be understood that any known and suitable fastening means may be used. Any suitable screw may be used, such as, for example, a socket head cap screw (not shown). Screw 22 may also comprise a flanged washer hex head cap screw with a screwdriver slot (not shown). In the preferred embodiment, a ¼-20UNC stainless steel bolt is used. It is to be understood that any other suitable fasteners, such as conventional bolts or screws, may be used. Any suitable nut 20 may also be used, with or without a suitable washer. In the preferred embodiment, a washer faced nut 21 is used, as best seen in FIG. 1. Nut 21 has a knurled face 23 on the load bearing surface (ie. the surface confronting leg 80) for enhanced gripping when assembled.

In the preferred embodiment, inner sealing member 72 is also formed from the flexibly rigid polymeric material, eg. an acetal resin, as discussed above in relation to the outer sealing member 70. As seen in FIGS. 2 and 3, the inner sealing member 72 has a substantially U-shaped cross section comprising two outwardly extending parallel legs, a first leg 78 being adjacent the wall 28 of the fluid containment region 40, and a second leg 80 being adjacent the seal member 14. As shown, the nuts 20 are laterally positionable between the first 78 and second 80 legs.

As best seen in FIG. 2, seal member 14 includes a plurality of bores 50 extending transversely through seal member 14 for inserting the seal member-to-inner sealing member attaching means. Screw securing plate 12 includes a plurality of apertures 52. Inner sealing member 72 has a plurality of apertures 82 disposed evenly around second leg 80. The plate apertures 52, seal bores 50, and leg apertures 82 are all in corresponding relation one to the other, as most clearly shown in FIG. 3. Any size and number of seal bores 50, leg apertures 82 and plate apertures 52 may be used. However, in the preferred embodiment, the seal member bores 50 are disposed evenly around seal member 14, as best seen in FIG. 1. Similarly, the screw plate apertures 52 are disposed evenly about screw plate 12; and the leg apertures 82 are disposed evenly about second leg 80.

Hollow sleeve 26 has an outer surface 38 and an inner, conduit receiving surface 36. Hollow sleeve 26 may further comprise an annular groove 34, disposed on outer surface 38 of support sleeve 26, for receiving the support sleeve-to-conduit attaching means. As best seen in FIG. 3, this annular groove 34 is releasably receiving worm gear hose clamp 18. In an alternate preferred embodiment, hollow sleeve 26 may further comprise two annular projections (not shown), disposed on, and preferably integrally formed in outer surface 38 of support sleeve 26, for receiving therebetween the support sleeve-to-conduit attaching means.

Hollow support sleeve 26 may further comprise at least one gripping flange 24a disposed on the inner, conduit receiving surface 36. A second gripping flange 24b is shown in FIG. 2.

The entry boot 10 is shown in its pre-installation state in FIGS. 1 and 2. In FIG. 3, it is shown installed. It can be appreciated that, during installation, the screw securing plate 12 provides distribution of the sealing forces as the nuts 20 are tightened. This compresses seal member 14 tightly against inner sealing member 72, forming a face seal. As face seals are less prone to the undesirable effects of thermal expansion and contraction than are circumferential seals, the fluid-tight nature of the present invention is enhanced.

Figure 5:
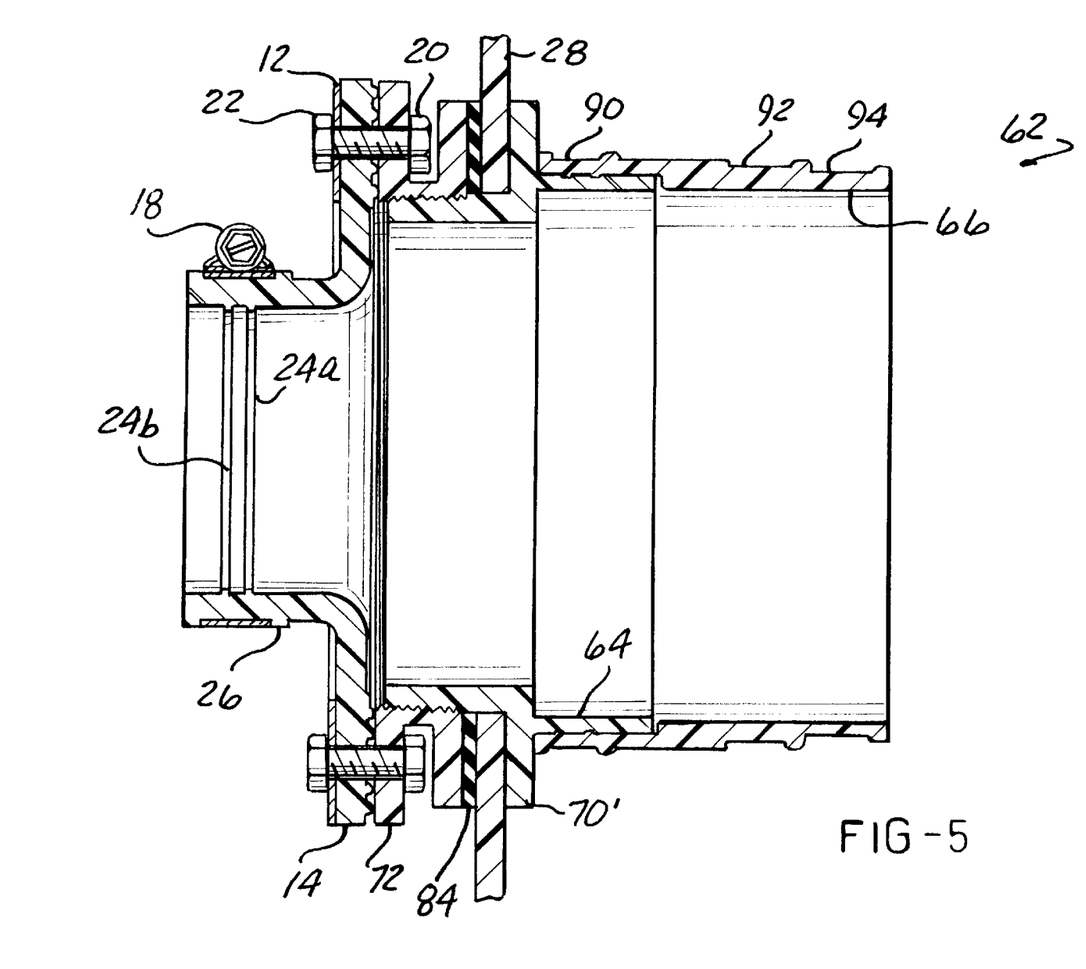
FIG. 5 is a cross-sectional view similar to FIG. 3, but showing an alternate embodiment of the present invention, including a bulkhead ducting boot.

The flexible entry boot 10 may further comprise a gasket 84 extending between the inner sealing member 72 and the wall 28 of the fluid containment region 40. A suitable adhesive 86 may extend about the periphery of gasket 84, the adhesive 86 extending between the gasket 84 and the inner sealing member 72. Although not shown, a second gasket, with or without adhesive, may be used between the confronting faces of outer sealing member 70 and the wall 28 of the fluid containment region 40. This second gasket may preferably be used in the embodiment as shown in FIG. 5, if desired.

The flexible entry boot 10 may optionally comprise a flexibly rigid, hollow reducer fitting 88 adapted to be snap-fit within the hollow support sleeve 26. This fitting 88 may be used in order to accommodate piping of a diameter lesser than that accommodated by the sleeve 26 alone. Entry boot 10 may further optionally comprise nubs (not shown) about the periphery of inner sealing member 72 and/or outer sealing member 70, about which a suitable tool may be applied for tightening and/or loosening purposes.

The flexible entry boot 10 as described hereinabove achieves, but is not limited to, the objects and advantages described more fully above.

Figure 4:
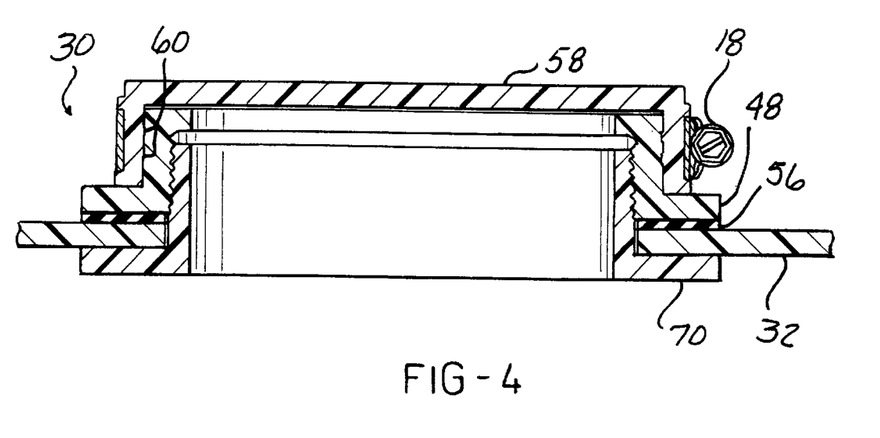
FIG. 4 is a cross-sectional view of an inspection port cover according to the present invention, shown installed in a lid of a fluid containment apparatus, the lid being broken away.

Referring now to FIG. 4, there is shown a threadingly engaged inspection port cover 30. Cover 30 utilizes the outer sealing member 70 discussed hereinabove, but member 70 is installed within the wall or lid 32 of a fluid containment apparatus, such as a tank sump or dispenser sump. Cover 30 further comprises a bulkhead clamping collar 48, threadingly engaged with sealing member 70, with a gasket material 56 disposed therebetween. An inspection port cover member 58 extends over and around clamping collar 48, and is secured thereto by a suitable hose clamp 18. Cover member 58 may include suitable sealing flanges 60.

Referring now to FIG. 5, there is shown a fitting 62 for incorporating a bulkhead ducting boot 66 to accommodate a perforated ducting system (not shown). Fitting 62 comprises seal member 14, inner sealing member 72, etc. as discussed above. However, outer sealing member 70' is altered so as to include an annular projection member 64, over which fits the flexibly rigid bulkhead ducting boot 66. Boot 66 may be secured to member 64 by any suitable means, such as a hose clamp (not shown) at clamping area 90. The perforated ducting system may be secured within boot 66 by any suitable means, such as hose clamps (not shown) at clamping areas 92, 94.

For any of the gaskets discussed hereinabove, it is to be understood that they may be formed from any suitable material, and in any suitable thickness. However, in the preferred embodiment, the gasket(s) is preferably a 3/16" thick nitrile material.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A flexible entry boot for providing a fluid-tight fitting between a wall of a fluid containment region and a conduit passing through the wall, the flexible entry boot comprising:
    a seal member disposed within the containment region;
    a securing plate, disposed within the containment region and mounted to the seal member;
    a flexibly rigid, hollow support sleeve attached to the seal member, the sleeve having an outer surface and an inner, conduit receiving surface, the hollow support sleeve further having a degree of flexibility sufficient to allow for the insertion of the conduit at angles equal to or other than an angle normal to the fluid containment wall while maintaining a fluid-tight environment;
    means for releasably attaching the hollow support sleeve to the conduit;
    an outer sealing member disposed outside the containment region;
    an inner sealing member disposed inside the containment region, the inner sealing member being matingly and sealingly engageable with the outer sealing member, with the wall of the fluid containment region extending therebetween wherein the securing plate is adapted to compress the seal member against the inner sealing member; and
    means for releasably attaching the seal member to the inner sealing member;
    wherein the seal member may be repaired or replaced without disengaging the outer sealing member from the inner sealing member.

2. The flexible entry boot as defined in claim 1 wherein the outer sealing member is threadingly engaged with the inner sealing member, and the outer sealing member is formed from a corrosion resistant material.

3. The flexible entry boot as defined in claim 2 wherein one of the outer sealing member and the inner sealing member is a flanged male collar and the other of the inner sealing member and the outer sealing member is a flanged female collar.

4. The flexible entry boot as defined in claim 1 wherein the seal member is substantially circular-shaped, and is oil and gas resistant.

5. The flexible entry boot as defined in claim 4 wherein the seal member is formed from nitrile rubber, and both the outer and inner sealing members are formed from an acetal resin.

6. The flexible entry boot as defined in claim 3 wherein the seal member has a plurality of bores extending transversely therethrough, the bores disposed evenly therearound.

7. The flexible entry boot as defined in claim 1 wherein the securing plate is annular, and wherein the hollow support sleeve is cylindrical.

8. The flexible entry boot as defined in claim 6 wherein the securing plate is a screw securing plate having a plurality of apertures disposed evenly therearound and in corresponding relation to the seal member bores.

9. The flexible entry boot as defined in claim 1 wherein the hollow support sleeve-to-conduit attaching means comprises a hose clamp.

10. The flexible entry boot as defined in claim 8 wherein the seal member-to-inner sealing member attaching means comprises a plurality of screw and nut assemblies.

11. The flexible entry boot as defined in claim 10 wherein the inner sealing member has a substantially U-shaped cross section comprising two outwardly extending parallel legs, a first leg being adjacent the wall of the fluid containment region, and a second leg being adjacent the seal member, and wherein the inner sealing member has a plurality of apertures disposed evenly around the second leg and in corresponding relation to the seal member bores, and further wherein the nuts are laterally positionable between the first and second legs.

12. The flexible entry boot as defined in claim 1, further comprising a gasket extending between the inner sealing member and the wall of the fluid containment region.

13. The flexible entry boot as defined in claim 12, further comprising adhesive extending between the gasket and the inner sealing member.

14. The flexible entry boot as defined in claim 1, further comprising a flexibly rigid, hollow reducer fitting adapted to be snap-fit within the hollow support sleeve.

15. The flexible entry boot as defined in claim 3 wherein the outer sealing member is the flanged male collar, and the inner sealing member is the flanged female collar.

16. The flexible entry boot as defined in claim 1 wherein the inner surface of the hollow support sleeve has a gripping flange disposed thereon, and the outer surface has an annular groove therein, and wherein the hollow sleeve has a first open portion integrally attached to the seal member, the first open portion having a central throughbore in fluid communication with the hollow support sleeve, and further wherein the hollow sleeve has a second open portion opposed to, and integrally attached to the first open portion, the first open portion adapted to flexibly receive the conduit, and the second open portion adapted to releasably hold the conduit in place.

17. The flexible entry boot as defined in claim 16 wherein the hollow support sleeve-to-conduit attaching means comprises a hose clamp receivable within the annular groove.

18. A flexible entry boot for providing a fluid-tight fitting between a wall of a fluid containment region and a conduit passing through the wall, the flexible entry boot comprising:
    a substantially circular-shaped, oil and gas resistant seal member disposed within the containment region, the seal member having a plurality of bores extending transversely therethrough, the bores disposed evenly therearound;
    an annular screw securing plate, disposed within the containment region and releasably mounted to the seal member, the screw securing plate having a plurality of apertures disposed evenly therearound and in corresponding relation to the seal member bores;
    a flexibly rigid, hollow, cylindrical support sleeve attached to the seal member, the sleeve having an outer surface and an inner, conduit receiving surface, the hollow support sleeve further having a degree of flexibility sufficient to allow for the insertion of the conduit at angles equal to or other than an angle normal to the fluid containment wall while maintaining a fluid-tight environment;
    means for releasably attaching the hollow support sleeve to the conduit;
    an outer sealing member formed from a corrosion resistant material and disposed outside the containment region;

an inner sealing member disposed inside the containment region, the inner sealing member being threadingly and sealingly engageable with the outer sealing member, with the wall of the fluid containment region extending therebetween, wherein one of the outer sealing member and the inner sealing member is a flanged male collar and the other of the inner sealing member and the outer sealing member is a flanged female collar, wherein the inner sealing member has a substantially U-shaped cross section comprising two outwardly extending parallel legs, a first leg being adjacent the wall of the fluid containment region, and a second leg being adjacent the seal member, and wherein the inner sealing member has a plurality of apertures disposed evenly around the second leg and in corresponding relation to the seal member bores; and means for releasably attaching the seal member to the inner sealing member, wherein the seal member-to-inner sealing member attaching means comprises a plurality of screw and nut assemblies, and wherein the nuts are laterally positionable between the first and second legs;

wherein the seal member may be repaired or replaced without disengaging the outer sealing member from the inner sealing member.

19. The flexible entry boot as defined in claim 18 wherein the seal member is formed from nitrile rubber, and both the outer and inner sealing members are formed from an acetal resin.

20. The flexible entry boot as defined in claim 18 wherein the outer sealing member is the flanged male collar, and the inner sealing member is the flanged female collar.

21. The flexible entry boot as defined in claim 20, further comprising a gasket adhesively sealed to the inner sealing member, and extending between the inner sealing member and the wall of the fluid containment region.

22. The flexible entry boot as defined in claim 18 wherein the inner surface of the hollow support sleeve has a gripping flange disposed thereon, and the outer surface has an annular groove therein, and wherein the hollow sleeve has a first open portion integrally attached to the seal member, the first open portion having a central throughbore in fluid communication with the hollow support sleeve, and further wherein the hollow sleeve has a second open portion opposed to, and integrally attached to the first open portion, the first open portion adapted to flexibly receive the conduit, and the second open portion adapted to releasably hold the conduit in place.

23. The flexible entry boot as defined in claim 22 wherein the hollow support sleeve-to-conduit attaching means comprises a hose clamp receivable within the annular groove.

24. The flexible entry boot as defined in claim 1, further comprising:

an annular projection member attached to the outer sealing member, the projection member extending outwardly therefrom in a direction away from the containment region;

a flexibly rigid, hollow bulkhead ducting boot having a first end portion opposed to a second end portion, the first end portion adapted to be mounted on the annular projection member; and means for releasably attaching the bulkhead ducting boot to the annular projection member.

\* \* \* \* \*